United States Patent [19]
Rogell

[11] 3,770,582
[45] Nov. 6, 1973

[54] NUCLEAR FUEL ELEMENT WITH STRENGTHENING DURING SHIPMENT

[75] Inventor: Martin L. Rogell, Hamden, Conn.

[73] Assignee: United Nuclear Corporation, Elmsford, N.Y.

[22] Filed: Nov. 4, 1971

[21] Appl. No.: 195,777

[52] U.S. Cl. .......................... 176/78, 206/65 R
[51] Int. Cl. ............................................. G21g 3/18
[58] Field of Search ................. 176/78; 206/65 R

[56] References Cited
UNITED STATES PATENTS

| | | | |
|---|---|---|---|
| 3,014,853 | 12/1961 | Sheehan | 176/78 |
| 3,357,305 | 12/1967 | Clutz et al. | 89/1.815 |
| 2,990,951 | 7/1961 | Fallert | 206/65 R |
| 3,352,758 | 11/1967 | Anthony | 176/78 |
| 3,350,275 | 10/1967 | Venier et al. | 176/76 |
| 3,281,328 | 10/1966 | Hazel et al. | 176/78 |

*Primary Examiner*—Reuben Epstein
*Attorney*—Dean S. Edmonds et al.

[57] ABSTRACT

The nuclear fuel element has an array of parallel fuel tubes or rods arranged in parallel rows. Rigid bars having opposing semi-circular formations or scallops on their opposite edges are placed between alternate pairs of rows of the tubes, advantageously in two directions at right angles to each other. The thickness of these bars is made substantially less than the water channel spacing between the rows of tubes and both edges of these scallops are chamfered. These two factors render the tube supports or bars easily insertable prior to shipment and easily removable later on.

4 Claims, 3 Drawing Figures

PATENTED NOV 6 1973 3,770,582

INVENTOR.
MARTIN L. ROGELL
BY
Pennie, Edmonds, Morton, Taylor & Adams
ATTORNEYS

NUCLEAR FUEL ELEMENT WITH STRENGTHENING DURING SHIPMENT

CROSS REFERENCES TO RELATED APPLICATIONS

Nuclear fuel elements are usually provided with rod or tube spacer devices or spacer grid assemblies having both rigid and flexible restraints to control bowing and vibration of the tubes during the operation of the nuclear reactor in which the fuel element is placed. Application Ser. No. 108,324 filed Jan. 21, 1971, entitled "Nuclear Fuel Element with Multiple Fuel Tubes" filed by Joseph R. Weiss and Richard J. Slember and assigned to the assignee of the present application discloses a nuclear fuel element in which the spacer devices or spacer grid assemblies referred to above are employed.

BRIEF SUMMARY OF THE INVENTION

While the spacer devices referred to are adequate to prevent undue bowing and vibration of the fuel rods or tubes during operation of the nuclear reactor, much greater strengthening or stiffening of the fuel rods or tubes is necessary during shipment of the fuel element from the point of manufacture to the point of installation in the reactor. Heretofore either flat or corrugated strips of plastic have been forced between the rows of fuel rods or tubes but these have been found difficult to insert prior to shipment and even more difficult to remove prior to installation in the nuclear reactor.

Since these flat strips provide tube support in one direction only additional flat strips were forced in at right angles and in close proximity to the first set in order to provide containment in two directions. These flat plastic strips require tying together by string or nylon cord to prevent them from working loose. The use of these flat strips was additionally undesirable because of the very large number required and because of the time required and the cost involved.

In accordance with the present invention rigid support bars rectangular in cross-section and made from any metallic or non-metallic material, or any combination thereof and having a thickness which is sufficiently less than the spacing between the fuel rods or tubes to allow the bars to be readily inserted and removed therefrom are provided with semi-circular cutouts or scallops arranged in opposing pairs, and both edges of the semi-circular formations or scallops are chamfered. Because of the thinness of these support bars and the chamfering of their scalloped edges such bars can be easily inserted between adjacent rows of fuel rods or tubes, and then rotated through an angle of 90° which places the surfaces of the scallops in contact with the surfaces of the adjacent rods or tubes. Because of the semi-circular formations, each tube is supported against vibration in two directions.

The use of the rigid, easily insertable and removable support bars of the invention with the fuel rods or tubes of nuclear fuel elements, fuel cluster or fuel bundle assemblies prevents any tendency toward rod vibration, bowing or bending and fuel pellet damage. In addition these supports protect the rigid and flexible restraints of any spacer grid assemblies which may be used to prevent vibration of the rods or tubes.

U.S. Pat. No. 2,990,951, Fallert, "Paper Board Containers and Method of Erecting and Simultaneously Loading Same" discloses a shipping container for automobile drive shafts and other rods wherein these objects are supported in approximately semi-circular recesses.

The Clutz et al. U.S. Pat. No. 3,357,305 "Expandable Dual Purpose Rocket-Launcher Shipping Container" relates to shipping rockets to any area which is considered a firing location. The individual rocket tubes are arranged in horizontal rows and each row is supported by "saddles." These saddles have concave grooves for receiving the individual rocket tubes.

Neither of these patents however discloses or suggests the idea of making the "inserts 25" of Fallert or the "saddles" of Clutz et al. insertable or removable. Particularly the saddles 7 are neither insertable or removable from the rows of launching tubes 13.

DETAILED DESCRIPTION

Figure 1:
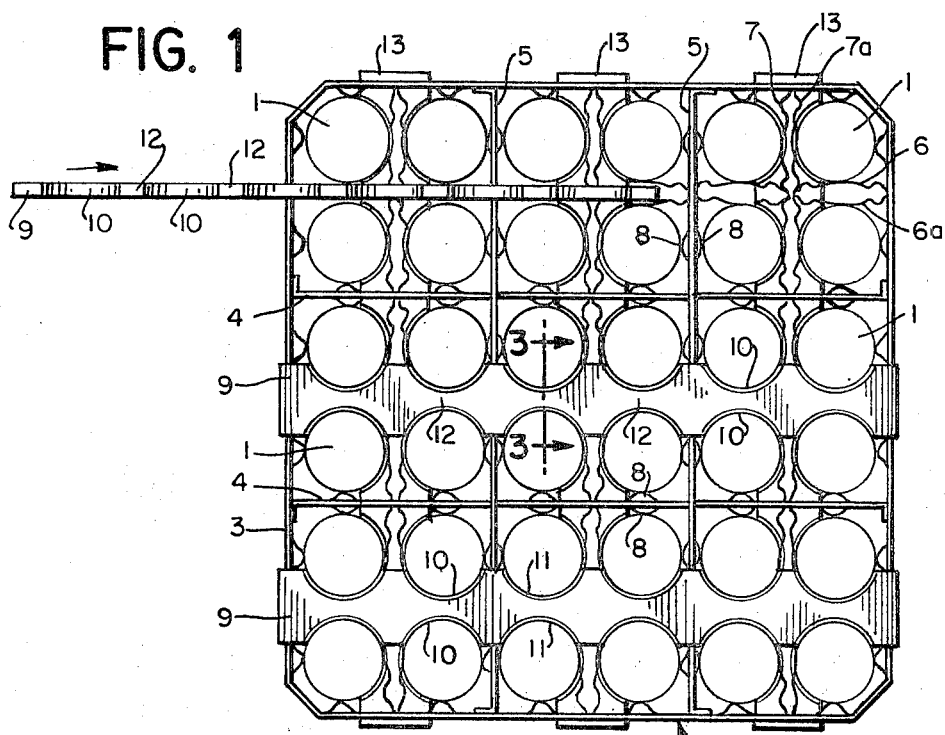
FIG. 1 is a diagrammatic end view of a nuclear fuel element showing a cluster or bundle of tubes.

FIG. 1 shows an array of fuel rods or tubes 1 in a cluster or bundle of 36 tubes arranged in rows of six tubes each at right angles to one another. The diameter of these tubes is from about 0.3 to about 0.5 of an inch. Such a fuel element or bundle of tubes is usually surrounded by a shroud or shell as shown in application Ser. No. 108,324 above referred to. Also as shown in that application and in FIG. 1 of the present application the tubes are supported by spacer devices or spacer grid assemblies 2. These spacer devices are arranged in predetermined spaced relation to each other throughout the length of the fuel element. Each of the spacer devices includes a rigid thin metallic band 3 which surrounds the 36 tubes as shown in FIG. 1.

Within band 3 there are two spaced parallel rigid metallic strips 4 which extend from one wall to the other of band 3. There are also two similar metallic strips 5 which are similarly spaced apart and extend from wall to wall of band 3 in a direction at right angles to strips 4. The arrangement is such that these two pairs of rigid strips subdivide the interior of shell 2 into 9 square spaces each containing four of the fuel tubes 1.

Each of these 9 spaces is further subdivided into four cells by pairs of resilient or spring-like strips 6 and 6a. These strips are spaced close together and are arranged parallel with the rigid strips 4. At right angles to these are similar pairs of spring strips 7 and 7a which are parallel with rigid strips 5. In this way each of the tubes 1 is engaged at four points 90° apart around the circumference of the tube for the purpose of restraining bowing and vibration during operation in the nuclear reactor. For each tube two of its contact points are with the beads 8 formed on the rigid parts of the spacer device, and two contact points are with the resilient strips 6, 6a and 7, 7a.

In order to provide the additional strengthening of the tubes 1 of the array during shipment support bars 9 and 13 are employed. Bars 9 are positioned between alternate pairs of horizontal rows of the rods or tubes 1 as shown in FIG. 1. The uppermost bar 9 of FIG. 1 is illustrated in edgewise position which emphasizes that the thickness of this bar is enough less than the spacing distance of the tubes in these rows so that the bar may be slid into position substantially without effort.

This uppermost bar 9 in FIG. 1 is shown during the insertion operation and when the bar has been fully inserted it is turned through an angle of 90° which reveals its side view as illustrated by the two lower support bars 9 of FIG. 1. This position reveals the fact that the bars 9 are provided with a series of equally spaced semi-circular formations or scallops 10. These formations are arranged opposite one another in the opposite edges of the support bar and are equally spaced apart lengthwise of the bar to correspond with the spacing apart of the tubes 1.

Figure 3:
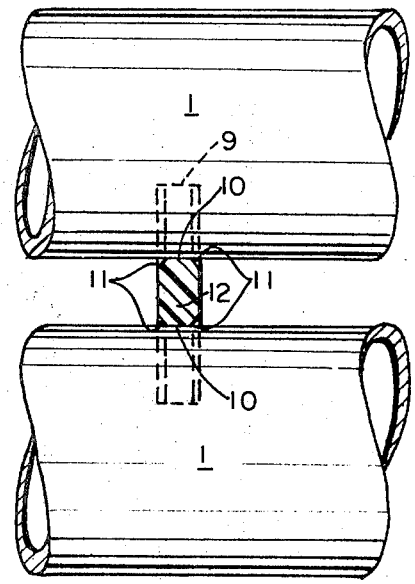
FIG. 3 is a vertical section taken on line 3—3 of FIG. 1 drawn to an enlarged scale.

It will be observed also that each of the semi-circular formations or scallops 10 is chamfered along its semi-circular surface as indicated by reference numeral 11. This is illustrated in FIG. 3 where a central portion 12 of one of the support bars 9 is shown in section and its chamfered corners 11 are emphasized.

Figure 2:
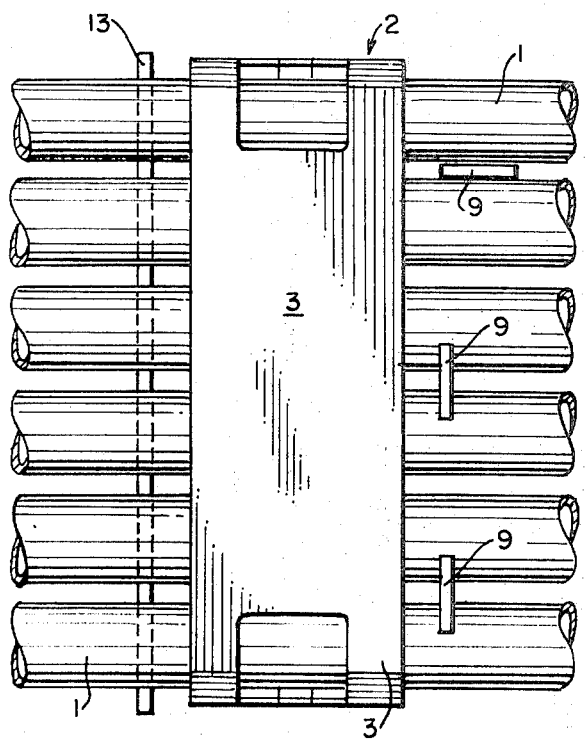
FIG. 2 is a side view of a fragment of the tubes of FIG. 1.

Referring to FIG. 2 the support bar 9 between the uppermost pair of rows of tubes 1 is shown in the position corresponding to that of FIG. 1 during the operation of insertion. This emphasizes the thinness that is the difference between the thickness of the support bar and the spacing apart of tubes 1. The two lower support bars 9 of FIG. 2 are shown after their rotation into positions at right angles to the axes of the tubes.

Support bars 13 which are similar in all respects to support bars 9 are shown in FIG. 1 in position between the alternate pairs of vertical rows of tubes 1. One of these support bars 13 is also shown in FIG. 2. With both sets of support bars 9 and 13 in position the tubes 1 are supported in such a way that it is impossible for them to vibrate or bend in any direction.

Support bars 9 are placed approximately ¼ inch either side of the spacer device or spacer grid assemblies throughout the length of the rods or tubes 1 of the fuel element or tube bundle. Support bars 13 are similarly spaced. Because each rod or tube is supported in two directions by the semi-circular engagement surfaces of the respective scallops 10 of each of the sets of supporting bars 9 and 13 great protection is given the spacer grid assemblies 2. The bundle of 36 tubes is converted into a unit of great solidity, the individual elements of which are immovable relative to one another.

I claim:

1. In a fuel assembly for a nuclear reactor comprising a plurality of elongated fuel tubes having their longitudinal axes substantially parallel and being arrayed in spaced rows, each row comprising more than one of said fuel tubes, the improvement for limiting bowing and vibration of said fuel tubes and damage to said tubes and the fuel pellets contained therein, which improvement comprises in combination with said assembly:
   a. a plurality of elongated fuel tube support bars, each of said bars being positioned within said assembly between adjacent rows of fuel tubes at a point located longitudinally intermediate the ends of the tubes thereof;
   b. each of said support bars being wider in one direction perpendicular to its length than the distance between the fuel tubes of said adjacent rows and each being thinner in another direction perpendicular to its length than the distance between the fuel tubes of said adjacent rows such that said bar may be freely inserted and removed from between said adjacent rows of fuel tubes when the support bar is oriented such that said one direction extends substantially parallel to the planes defined by said adjacent rows of fuel tubes; and
   c. each of said support bars having a plurality of spaced apart scallops in its opposite edges, each of said scallops being positioned in alignment with one of the fuel tubes in said adjacent rows to engagingly accept said one fuel tube when the support bar is oriented such that said one direction extends substantially perpendicular to the planes defined by said adjacent rows of fuel tubes.

2. The improvement according to claim 1 wherein opposite sides of the fuel tube engaging surfaces of each of said scallops are chamfered to facilitate in-situ rotation of the support bar between said first mentioned orientation and said last mentioned orientation.

3. In a fuel assembly for a nuclear reactor comprising a plurality of elongated fuel tubes having their longitudinal axes substantially parallel and being arrayed in spaced rows, the improvement for limiting bowing and vibration of said fuel tubes and damage to said tubes and the fuel pallets contained therein, which improvement comprises in combination with said assembly:
   a. two series of support bars insertable between adjacent rows of the fuel tubes, each of said support bars being thinner in one direction perpendicular to its length than the spacing between the fuel tubes in said adjacent rows so as to be freely insertable between and removable from said adjacent rows in said array, each of said support bars being wider in another direction perpendicular to its length than the spacing between the fuel tubes in said adjacent rows, the bars of one series extending between alternate adjacent rows of fuel tubes and the bars of the other series being disposed between alternate adjacent rows extending perpendicularly to the rows between which said first series of bars is positioned; and
   b. each support bar having opposing semi-circular scalloped portions formed in opposite sides of the surface defined by said wider dimension, the curved surface of each scalloped portion being chamfered to facilitate in-situ rotation of the bar from a position where the surface defined by said wider dimension extends substantially parallel to the planes defined by the tubes of said adjacent rows to a position where said last mentioned surface extends substantially perpendicular to said planes to thereby cause the curved surface of each scalloped portion to engage the said tubes and to facilitate in-situ rotation of the bar back to said parallel oriented position for removal from between said adjacent rows.

4. In a fuel assembly for a nuclear reactor comprising a plurality of elongated fuel tubes having their longitudinal axes substantially parallel and being arrayed in spaced rows and at least one fuel tube spacer device disposed in predetermined spaced relation throughout the length of said fuel tubes for restraining the individual tubes of said array from bowing and vibration during operation of the reactor, the improvement from limiting bowing and vibration of the fuel tubes during shipment before installation in said reactor, which improvement comprises in combination with said assembly:

a. two series of support bars insertable between adjacent rows of the fuel tubes, each of said support bars being thinner in one direction perpendicular to its length than the spacing between the fuel tubes in said adjacent rows so as to be freely insertable between and removable from said adjacent rows in said array, each of said support bars being wider in another direction perpendicular to its length than the spacing between the fuel tubes in said adjacent rows, the bars of one series extending between alternate adjacent rows of fuel tubes and the bars of the other series being disposed between alternate adjacent rows extending perpendicularly to the rows between which said first series of bars is positioned; and b. each support bar having opposing semi-circular scalloped portions formed in opposite sides of the surface defined by said wider dimension, the curved surface of each scalloped portion being chamfered to facilitate in-situ rotation of the bar from a position where the surface defined by said wider dimension extends substantially parallel to the planes defined by the tubes of said adjacent rows to a position where said last mentioned surface extends substantially perpendicular to said planes to thereby cause the curved surface of each scallop portion to engage the said tubes and to facilitate in-situ rotation of the bar back to said parallel oriented position for removal from between said adjacent rows.

* * * * *